(12) United States Patent
Tokuyama et al.

(10) Patent No.: US 10,906,011 B2
(45) Date of Patent: Feb. 2, 2021

(54) LAYERED SEMIPERMEABLE MEMBRANE

(71) Applicant: TORAY INDUSTRIES, INC., Tokyo (JP)

(72) Inventors: Takahiro Tokuyama, Shiga (JP); Takafumi Ogawa, Shiga (JP); Hiroki Tomioka, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/080,438

(22) PCT Filed: Feb. 28, 2017

(86) PCT No.: PCT/JP2017/008023
§ 371 (c)(1),
(2) Date: Aug. 28, 2018

(87) PCT Pub. No.: WO2017/150585
PCT Pub. Date: Sep. 8, 2017

(65) Prior Publication Data
US 2019/0022602 A1  Jan. 24, 2019

(30) Foreign Application Priority Data

Feb. 29, 2016 (JP) ................... 2016-036910

(51) Int. Cl.
*B01D 71/40* (2006.01)
*B01D 69/12* (2006.01)
(Continued)

(52) U.S. Cl.
CPC ......... *B01D 71/40* (2013.01); *B01D 67/0006* (2013.01); *B01D 67/0079* (2013.01);
(Continued)

(58) Field of Classification Search
CPC .. B01D 71/40; B01D 69/125; B01D 67/0006; B01D 71/62; B01D 67/0079;
(Continued)

(56) References Cited

U.S. PATENT DOCUMENTS

| 3,133,132 A | 5/1964 | Loeb et al. |
| 4,277,344 A | 7/1981 | Cadotte |

(Continued)

FOREIGN PATENT DOCUMENTS

| CN | 1214710 A | 4/1999 |
| CN | 102378645 A | 3/2012 |

(Continued)

OTHER PUBLICATIONS

International Search Report (PCT/ISA/210) issued in PCT/JP2017/008023, dated May 30, 2017.
(Continued)

*Primary Examiner* — Taiwo Oladapo
(74) *Attorney, Agent, or Firm* — Birch, Stewart, Kolasch & Birch, LLP

(57) ABSTRACT

The present invention relates to a layered semipermeable membrane satisfying the conditions below. (A) The maximum peak intensity between 3700 and 2900 $cm^{-1}$ is 0.08 or greater in the difference spectrum between an IR spectrum measured at 25° C. and 97% relative humidity and an IR spectrum measured at 25° C. and 3% relative humidity. (B) The peak top wavenumber between 3700 and 2900 $cm^{-1}$ of the aforementioned difference spectrum is 3400 $cm^{-1}$ to 3550 $cm^{-1}$. (C) The N1s peak has a maximum value at 401 eV or greater in X-ray photoelectron spectroscopy in which X-rays are radiated to a coat layer.

12 Claims, 1 Drawing Sheet

(51) Int. Cl.
*B01D 71/56* (2006.01)
*B01D 71/82* (2006.01)
*B32B 27/00* (2006.01)
*B01D 67/00* (2006.01)
*B01D 71/62* (2006.01)
*B01D 69/10* (2006.01)
*B32B 27/34* (2006.01)

(52) U.S. Cl.
CPC ......... *B01D 67/0088* (2013.01); *B01D 69/10* (2013.01); *B01D 69/12* (2013.01); *B01D 69/125* (2013.01); *B01D 71/56* (2013.01); *B01D 71/62* (2013.01); *B01D 71/82* (2013.01); *B32B 27/00* (2013.01); *B01D 2323/30* (2013.01); *B01D 2323/34* (2013.01); *B01D 2325/028* (2013.01); *B01D 2325/14* (2013.01); *B01D 2325/26* (2013.01); *B32B 27/34* (2013.01)

(58) Field of Classification Search
CPC .... B01D 67/0088; B01D 69/12; B01D 71/56; B01D 71/82; B01D 69/10; B01D 2325/14; B01D 2325/26; B01D 2323/30; B01D 2323/34; B01D 2325/028; B01D 67/0093; B32B 27/00; B32B 27/34
See application file for complete search history.

(56) References Cited

U.S. PATENT DOCUMENTS

| | | | |
|---|---|---|---|
| 5,348,652 A | 9/1994 | Creusen et al. | |
| 6,045,694 A | 4/2000 | Wang et al. | |
| 6,177,011 B1 | 1/2001 | Hachisuka et al. | |
| 6,177,181 B1 | 1/2001 | Hamada et al. | |
| 6,565,748 B1 | 5/2003 | Wang et al. | |
| 2005/0126987 A1 | 6/2005 | Schneider et al. | |
| 2010/0197859 A1 | 8/2010 | Weber et al. | |
| 2012/0024778 A1 | 2/2012 | Minehara et al. | |
| 2013/0316087 A1 | 11/2013 | Ahn et al. | |
| 2015/0259227 A1 | 9/2015 | Takamoto et al. | |
| 2015/0259488 A1 | 9/2015 | Takamoto et al. | |
| 2015/0274891 A1 | 10/2015 | Konradi et al. | |
| 2015/0328588 A1* | 11/2015 | Schmidt-Leithoff | B01D 61/08 210/650 |

FOREIGN PATENT DOCUMENTS

| | | |
|---|---|---|
| CN | 103547347 A | 1/2014 |
| CN | 104684634 A | 6/2015 |
| CN | 104994938 A | 10/2015 |
| JP | 5-507233 A | 10/1993 |
| JP | 9-099228 A | 4/1997 |
| JP | 2000-515062 A | 11/2000 |
| JP | 2002-336666 A | 11/2002 |
| JP | 2005-527351 A | 9/2005 |
| JP | 2010-201303 A | 9/2010 |
| JP | 2010-538137 A | 12/2010 |
| WO | WO 97/34686 A1 | 9/1997 |

OTHER PUBLICATIONS

Kurihara et al., "The Major Developments of the Evolving Reverse Osmosis Membranes and Ultrafiltration Membranes", Polymer Journal, vol. 23. No. 5, 1991, pp. 513-520.
Written Opinion (PCT/ISA/237) issued in PCT/JP2017/008023, dated May 30, 2017.
Gu et al., Production of Sodium Hyaluronate and Clinical Application Thereof, Shanghai Science and Technology Press, 2012, p. 206.
Office Action dated Aug. 3, 2020, in Chinese Patent Application No. 201780013648.4.

\* cited by examiner

LAYERED SEMIPERMEABLE MEMBRANE

RELATED APPLICATION

This application is a national stage entry of PCT/JP2017/00802, filed Feb. 28, 2017, which claims the benefit of priority to Japanese Patent Application No. 2016-036910, filed Feb. 29, 2016, which is incorporated by reference in its entirety.

TECHNICAL FIELD

The present invention relates to a semipermeable membrane useful for selective separation of a liquid mixture and relates to a layered semipermeable membrane excellent in oxidizing agent resistance and fouling resistance.

BACKGROUND ART

An asymmetric semipermeable membrane made of a polymer such as cellulose acetate, and a composite semipermeable membrane including a microporous support layer and a separation functional layer provided on the microporous support layer are known water treatment separation membranes for blocking permeation of dissolved components.

In particular, a composite semipermeable membrane having a separation functional layer made of a polyamide (hereinafter, referred to as "polyamide separation functional layer") is most widely used, because it not only has the advantage that the membrane can be easily produced by interfacial polycondensation of a polyfunctional amine with a polyfunctional acid halide, but also has high pressure resistance and can achieve high salt rejection ratio and high permeation flux (Patent Documents 1 and 2).

However, the polyamide separation functional layer has insufficient durability against an oxidizing agent, and salt rejection performance and selective separation performance of the semipermeable membrane are deteriorated due to chlorine, hydrogen peroxide, etc. used for sterilization of the membrane.

As examples of the technology enhancing the durability of the semipermeable membrane against an oxidizing agent, Patent Document 3 describes a technique of substituting an alkyl group on nitrogen atom of a polyamide, which is a reaction point of the polyamide with the oxidizing agent. Patent Document 4 describes a technique in which a polyamide membrane surface is brought into contact with an emulsion solution of a polymer such as polyvinyl acetate and then dried by heating at a temperature not less than the glass transition temperature of the polymer. In addition, Patent Document 5 describes a technique in which an amine compound having at least two amino groups in the molecule and, for example, an organosilicon compound having an alkoxysilane structure in the molecule and having, in the molecule, at least one functional group selected from the group consisting of an amino group and an oxirane ring are reacted on a porous substrate to form a thin membrane responsible for the separation function.

Meanwhile, one of the problems occurring in a desalination plant using a reverse osmosis membrane is fouling by membrane contaminants such as inorganic substances or organic substances. The amount of the reverse osmosis membrane permeate is significantly reduced by fouling. As the method for improving this, for example, a method of coating a separation functional layer surface with a polyvinyl alcohol to create a neutral charge state and thereby prevent fouling has been proposed (see, Patent Document 6).

BACKGROUND ART DOCUMENTS

Patent Documents

Patent Document 1: U.S. Pat. No. 3,133,132
Patent Document 2: U.S. Pat. No. 4,277,344
Patent Document 3: JP-A-2002-336666
Patent Document 4: JP-A-2010-201303
Patent Document 5: JP-A-9-99228
Patent Document 6: WO 97/34686

Non-Patent Documents

Non-Patent Document 1: Kurihara, et al., Polymer Journal, Vol. 23, p. 513, The Society of Polymer Science, Japan (1991)

SUMMARY OF THE INVENTION

Problems that the Invention is to Solve

However, the techniques described in Patent Documents 3 to 5 have a problem that the salt rejection performance in the initial stage, i.e., before being affected by an oxidizing agent, is low.

In addition, Non-Patent Document 1 indicates that oxidation of a polyamide is significantly accelerated by the coexistence of an oxidizing agent and a trace heavy metal. In using a water treatment membrane, the raw water to be treated contains a heavy metal in many cases and in practical use, an oxidizing agent and a heavy metal often coexist.

Furthermore, the membranes described in Patent Documents 1 and 2 have a problem that the fouling resistance is low. Meanwhile, in the membrane described in Patent Document 3, the permeate amount may be reduced by the coating.

The present invention has been made in consideration of these conventional circumstances and aims at providing a semipermeable membrane which has oxidizing agent resistance even in the presence of a heavy metal and at the same time, can achieve a salt rejection performance equal to that of a semipermeable membrane with poor durability against an oxidizing agent and exhibit fouling resistance.

Means to Solve the Problems (1) A layered semipermeable membrane including a semipermeable layer and a coat layer formed on the semipermeable layer and satisfying the following conditions (A), (B) and (C):

(A) in a differential spectrum between an IR spectrum measured under conditions of 25° C. and a relative humidity of 97% and an IR spectrum measured under conditions of 25° C. and a relative humidity of 3%, the maximum peak intensity between 3,700 $cm^{-1}$ and 2,900 $cm^{-1}$ is 0.08 or more, (B) a peak top wavenumber between 3,700 $cm^{-1}$ and 2,900 $cm^{-1}$ in the differential spectrum is 3,400 $cm^{-1}$ or more and 3,550 $cm^{-1}$ or less, and (C) in a X-ray photoelectron spectroscopic measurement performed by irradiating the coat layer with X-ray, a peak of N1s has a maximum value at 401 eV or more.

(2) The layered semipermeable membrane according to (1), in which a surface zeta potential at pH 7 on the coat layer side is from −15 mV to +10 mV.

(3) The layered semipermeable membrane according to (1) or (2), in which the coat layer has both of the following structures (I) and (II):

[Chem. 1]

—X—R$^1$—Y  (I)

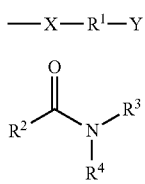  (II)

(wherein X is a positively charged group and is an imidazolium group or a pyridinium group, each of which may have a substituent, R$^1$ is a group selected from an alkylene group having a carbon number of 6 or less, an arylene group, an amido group, and an ether group, each of which may have a substituent, Y is a negatively charged group and is a group selected from structures shown in (III) below, each of R$^2$, R$^3$ and R$^4$ is independently a group selected from an alkyl group, an alkylene group, an aryl group, and an arylene group, each of which may have a substituent, and any two of R$^2$, R$^3$ and R$^4$ may form a ring);

[Chem. 2]

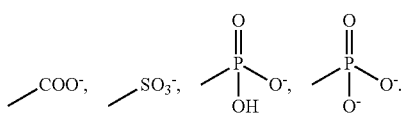  (III)

(4) The layered semipermeable membrane according to (3), in which in the structure (I), X is an imidazolium group which may have a substituent, R$^1$ is an ethylene group or a propylene group, each of which may have a substituent, and Y is a group selected from structures in (IV) below:

[Chem. 3]

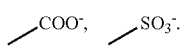  (IV)

(5) The layered semipermeable membrane according to (1) or (2), in which the coat layer contains a copolymer Y having at least three kinds of repeating unit structures P1, P2 and P3 different from each other, of which the repeating unit structure P1 has the following structure X1 in a side chain thereof, the repeating unit structure P2 has the following structure X2 in a side chain thereof, and the repeating unit structure P3 has the following structure X3 in a side chain thereof:

[Chem. 4]

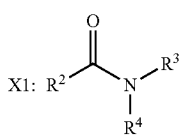  (II)

(wherein each of R$^2$, R$^3$, R$^4$ is independently a group selected from an alkyl group, an alkylene group, an aryl group, and an arylene group, each of which may have a substituent, and any two of R$^2$, R$^3$ and R$^4$ may form a ring), X2: a negatively charged group, and X3: a positively charged group (provided that the repeating unit structure P2 does not have a positively charged group in the side chain simultaneously and the repeating unit structure P3 does not have a negatively charged group in the side chain simultaneously).

(6) The layered semipermeable membrane according to (5), in which the negatively charged group is at least one functional group selected from structures in (III) below:

[Chem. 5]

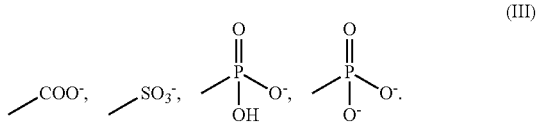  (III)

(7) The layered semipermeable membrane according to (5) or (6), in which the positively charged group is at least one functional group selected from an ammonium group, an imidazolium group, and a pyridinium group.

(8) The layered semipermeable membrane according to any one of (5) to (7), in which the copolymer Y is crosslinked to each other.

(9) The layered semipermeable membrane according to (8), in which the copolymer Y further contains a repeating unit structure P4 having the following structure X4 in a side chain thereof, has at least four kinds of repeating unit structures P1, P2, P3 and P4 different from each other, and is crosslinked to each other via the structure X4 contained in the side chain thereof:

X4: an amino group, a hydroxyl group, or a thiol group.

(10) The layered semipermeable membrane according to (9), in which the crosslinked structure comprises a structure represented by X4-Q-X4 and Q comprises either one of the following structures:

[Chem. 6]

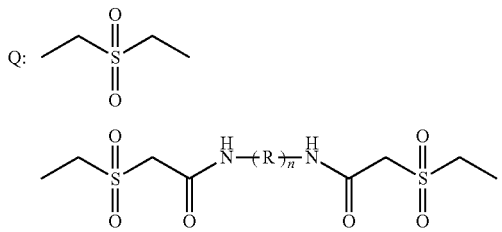

(wherein R is a hydrocarbon group and n is an integer of 0 or more and 5 or less).

(11) The layered semipermeable membrane according to any one of (1) to (10), in which a thickness of the coat layer is from 50 nm to 500 nm.

(12) The layered semipermeable membrane according to any one of (1) to (11), in which:

the semipermeable layer comprises a microporous support layer and a separation functional layer provided on the microporous support layer, and the separation functional layer contains a polyamide formed by polycondensation of a polyfunctional amine with a polyfunctional acid halide.

(13) The layered semipermeable membrane according to any one of (5) to (11), including the semipermeable layer and the coat layer formed on the semipermeable layer, in which:

the coat layer contains a polymerized product formed by polymerization of three or more kinds of monomers including at least the following compounds (A), (B) and (C) or a crosslinked body of the polymerized product:

(A) a compound having an ethylenically unsaturated group and the structure X1, (B) a compound having an ethylenically unsaturated group and the structure X2, other than the compound (A), and (C) a compound having an ethylenically unsaturated group and the structure X3, other than the compounds (A) and (B)

(provided that compound (B) does not have a positively charged group simultaneously and compound (C) does not have a negatively charged group simultaneously).

(14) The layered semipermeable membrane according to (13), in which the coat layer comprises a polymerized product formed by polymerization of four or more kinds of monomers including at least the following compounds (A), (B), (C) and (D) or a crosslinked body of the polymerized product and the crosslink is formed via the structure X4 contained in a side chain of the polymerized product:

(A) a compound having an ethylenically unsaturated group and the structure X1, (B) a compound having an ethylenically unsaturated group and the structure X2, other than the compound (A), (C) a compound having an ethylenically unsaturated group and the structure X3, other than the compounds (A) and (B), and (D) a compound having an ethylenically unsaturated group and the structure X4, other than the compounds (A), (B) and (C).

(15) A method for producing a layered semipermeable membrane, including:

(1) a step of coating a separation functional layer with a solution containing at least a polymer obtained by polymerization of monomers represented by the following structures (V) and (VI) and a crosslinking agent, and (2) a step of crosslinking the polymers to each other or the polymer to a semipermeable layer after the step (1) to form a covering coat layer:

[Chem. 7]

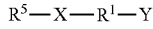

(V)

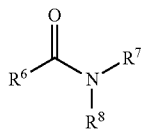

(VI)

(wherein X is a positively charged group and is an imidazolium group or a pyridinium group, each of which may have a substituent, $R^1$ is a group selected from an alkylene group having a carbon number of 6 or less, an arylene group, an amido group, and an ether group, each of which may have a substituent, Y is a negatively charged group and is a group selected from structures shown in (III) below, $R^5$ is a group having an ethylenically unsaturated group, at least one of $R^6$, $R^7$ and $R^8$ is a group having an ethylenically unsaturated group, the remainders are hydrogen or a group selected from an alkyl group, an alkylene group, an aryl group, and an arylene group, each of which may have a substituent, and may be the same or different, and in the case where two of $R^6$, $R^7$ and $R^8$ have no ethylenically unsaturated group, these two groups may form a ring);

[Chem. 8]

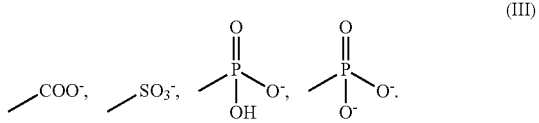

(III)

Advantage of the Invention

The layered semipermeable membrane of the present invention has a coat layer and can thereby achieve high oxidizing agent resistance even in the presence of a heavy metal. Furthermore, an inorganic stain, an organic stain, etc. are hard to stick with the coat layer of the present invention. In this way, since the oxidizing agent resistance in the presence of a heavy metal is enhanced, high salt rejection performance can be exerted on raw water in which an oxidizing agent remains due to a sterilization treatment, etc., sticking of a stain is less likely to occur, and stable operation can be continued.

MODE FOR CARRYING OUT THE INVENTION

I. Polymer Layered Semipermeable Membrane

Figure 1:
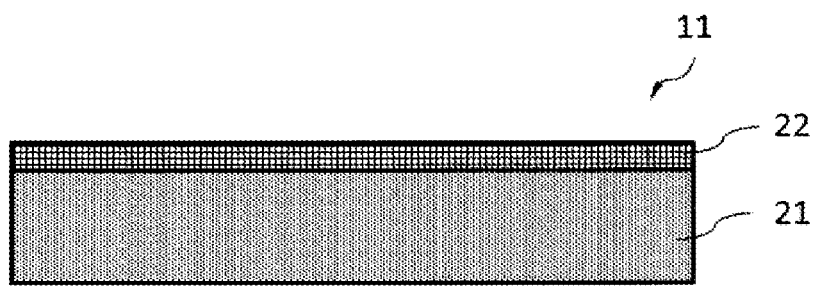
FIG. 1 is a cross-sectional diagram illustrating a schematic configuration of the layered semipermeable membrane with an asymmetric semipermeable layer according to a first embodiment of the present invention.
Figure 2:
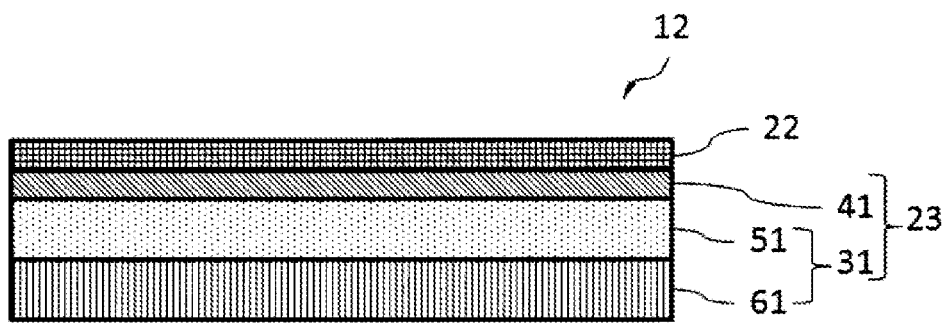
FIG. 2 is a cross-sectional diagram illustrating a schematic configuration of the layered semipermeable membrane with a composite semipermeable layer according to a second embodiment of the present invention.

FIGS. 1 and 2 illustrate an example of the structure of the polymer layered semipermeable membrane of the present invention. The polymer layered semipermeable membrane ("11" in FIG. 1 and "12" in FIG. 2) includes a semipermeable layer ("21" in FIG. 1 and "23" in FIG. 2) and a coat layer ("22" in FIGS. 1 and 2) formed on the semipermeable layer.

The layered semipermeable membrane is a membrane having a function of removing ions from an aqueous solution. The "layered semipermeable membrane" includes, specifically, an RO (Reverse Osmosis) membrane and an NF (Nanofiltration) membrane.

[1. Semipermeable Layer]

In the present description, the semipermeable layer is a layer substantially responsible for ion removability of the polymer layered semipermeable membrane. More specifically, the semipermeable layer by itself has a function of removing ions from an aqueous solution and can function as an RO membrane or NF membrane. The semipermeable layer is roughly classified into an asymmetric semipermeable layer (i.e., asymmetric semipermeable membrane) and a composite semipermeable layer (i.e., composite semipermeable membrane).

(1-1) Asymmetric Semipermeable Layer

The layered semipermeable membrane 11 illustrated in FIG. 1 has an asymmetric semipermeable layer 21 and a coat layer 22 stacked thereon. The asymmetric semipermeable layer 21 is a semipermeable layer having a structure in which the pore size increases from first surface toward second surface of the membrane. In the asymmetric semipermeable layer 21, the vicinity of the dense membrane surface exerts a separation performance, and the inner part having a large pore size fulfills the role of reducing water permeation resistance to maintain water permeability and membrane strength.

The material of the asymmetric semipermeable layer includes cellulose acetate, cellulose triacetate, and polyamide.

(1-2) Composite Semipermeable Layer

The layered semipermeable membrane 12 illustrated in FIG. 2 includes a composite semipermeable layer 23 and a coat layer 22 stacked thereon. The composite semipermeable layer 23 has a microporous support layer 51 and a separation functional layer 41 provided on the microporous support layer 51.

(1-2-1) Microporous Support Layer

The microporous support layer supports the separation functional layer and thereby imparts strength to the composite semipermeable layer. The separation functional layer is provided on at least one surface of the microporous support layer. In FIG. 2, a separation functional layer 41 is provided on one surface of the microporous support layer 51. Hereinafter, the microporous support layer is sometimes simply referred to as "support layer".

The pore diameter on the surface of the support layer 51 (the surface on the side coming into contact with the separation functional layer 41) is preferably from 1 nm to 100 nm. When the pore diameter on the surface of the support layer is in the range above, a separation functional layer with sufficiently reduced defects can be formed on the surface. In addition, the composite semipermeable layer to be obtained can have a high pure-water permeation flux and maintain the structure during pressurized operation without causing sinking of the separation functional layer into pores of the support membrane.

The pore diameter on the surface of the support layer 51 can be calculated from an electron micrograph. The pore diameter can be determined by taking an electron micrograph of the surface of the support layer, measuring the diameter for all pores that can be observed, and calculating an arithmetic average thereof. In the case where the pore is not circular, the pore diameter can be obtained by a method of determining a circle (equivalent circle) having the same area as the area of the pore by means of an image processor, etc., and defining the equivalent-circle diameter as the diameter of the pore. As another technique, the pore diameter can be determined by differential scanning calorimetry (DSC) utilizing a principle that water present in a minute pore has a lower melting point than normal water. Details thereof are described in a literature, e.g., (Ishikiriyama et al., Journal of Colloid and Interface Science, Vol. 171, p. 103, Academic Press Inc. (1995)), etc.

The thickness of the support layer 51 is preferably from 1 μm to 5 mm, more preferably from 10 μm to 100 μm. If the thickness is small, the strength of the support layer readily decreases, as a result, the strength of the composite semipermeable layer tends to be reduced. If the thickness is large, the support layer and a composite semipermeable layer obtained therefrom are difficult to handle, for example, when used in a bent state.

The material constituting the support layer 51 is not particularly limited. The material constituting the support layer includes, for example, a homopolymer and a copolymer, such as polysulfone, polyethersulfone, polyamide, polyester, cellulose-based polymer, vinyl-based polymer, polyphenylene sulfide, polyphenylene sulfide sulfone, polyphenylene sulfone and polyphenylene oxide. Of these polymers, the support layer may contain only a single polymer or may contain a plurality of kinds of polymers.

Among the polymers above, examples of the cellulose-based polymer include cellulose acetate and cellulose nitrate. Preferred examples of the vinyl-based polymer include polyethylene, polypropylene, polyvinyl chloride, and polyacrylonitrile. The polymer is preferably a homopolymer or a copolymer, such as polysulfone, polyethersulfone, polyamide, polyester, cellulose acetate, cellulose nitrate, polyvinyl chloride, polyacrylonitrile, polyphenylene sulfide and polyphenylene sulfide sulfone. Among these materials, polysulfone and polyethersulfone, which are high in chemical stability, mechanical strength and thermal stability and ease of molding, are particularly preferred.

The support layer 51 preferably contains the above-described polymer as a main component. Specifically, the proportion of the polymer in the support layer is preferably 80 wt % or more, more preferably 90 wt % or more, still more preferably 95 wt % or more. The support layer may be constituted only by such a polymer.

(1-2-2) Separation Functional Layer

The separation functional layer 41 has a function of separating ions from an aqueous solution. In other words, the ion separation function of the semipermeable layer is achieved by the separation functional layer.

The separation functional layer 41 can contain a polymer such as polyamide, cellulose acetate or cellulose triacetate, as a main component. The proportion of the above polymer in the separation functional layer is preferably 80 wt% or more, more preferably 90 wt% or more, still more preferably 95 wt% or more. The separation functional layer may be constituted only by such a polymer. For example, the separation functional layer may be a layer made of a polyamide, which is formed by interfacial polycondensation of a polyfunctional amine and a polyfunctional acid halide on the support layer 51, or may be a layer formed from cellulose acetate, cellulose triacetate, polyamide, etc. by a non-solvent induced phase separation method.

The polyamide layer formed by the interfacial polycondensation of a polyfunctional amine and a polyfunctional acid halide is described below.

The polyfunctional amine is at least one component selected from an aliphatic polyfunctional amine and an aromatic polyfunctional amine.

The aliphatic polyfunctional amine is an aliphatic amine having two or more amino groups per molecule. The aliphatic polyfunctional amine is not limited to specific compounds, but examples thereof include a piperazine-based amine and a derivative thereof. Examples of the aliphatic polyfunctional amine include at least one compound selected from the group consisting of piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, and 2,5-di-n-butylpiperazine, and in view of stable performance manifestation, among others, piperazine and 2,5-dimethylpiperazine are preferred as the aliphatic polyfunctional amine.

The aromatic polyfunctional amine is an aromatic amine having two or more amino groups per molecule. The aromatic polyfunctional amine is not limited to specific compounds, but the aromatic polyfunctional amine includes metaphenylenediamine, paraphenylenediamine, 1,3,5-triaminobenzene, and examples of the N-alkylation product thereof include at least one compound selected from the group consisting of N,N-dimethylmetaphenylenediamine, N,N-diethylmetaphenylenediamine, N,N-dimethylparaphenylenediamine, and N,N-diethylparaphenylenediamine. In view of stable performance manifestation, among others, metaphenylenediamine and 1,3,5-triaminobenzene are preferred as the aromatic polyfunctional amine.

The polyfunctional acid halide is an acid halide having two or more carbonyl halide groups per molecule and may be sufficient if it produces a polyamide by the reaction with the above-described aromatic polyfunctional amine. The polyfunctional acid halide is not limited to specific compounds, and as the polyfunctional acid halide, an acid halide of, for example, at least one compound selected from the group consisting of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid may be used. Among polyfunctional acid halides, an acid chloride is preferred, and particularly, in view of profitability, availability, handleability, easy reactivity, etc., trimesoyl chloride that is a polyfunctional acid halide of 1,3,5-benzenetricarboxylic acid is preferred. The above-described polyfunctional acid halides may be used alone but may also be used as a mixture.

Details of the interfacial polymerization is described later.

(1-2-3) Substrate

The composite semipermeable layer 23 may further have a substrate 61 as illustrated in FIG. 2. The composite semipermeable layer can obtain high strength and dimensional stability by having the substrate 61. A laminate of the support layer and the substrate is sometimes referred to as "support membrane". In FIG. 2, the support membrane is denoted by reference numeral "31".

The substrate 61 includes fabric, nonwoven fabric, and paper.

As the substrate 61, a fibrous substrate is preferably used in view of strength, unevenness forming ability, and fluid permeability. As the fibrous substrate, both a long-fiber nonwoven fabric and a short-fiber nonwoven fabric are preferably used. In particular, the long-fiber nonwoven fabric has an excellent membrane-forming property and therefore makes it possible to: when a high-molecular polymer solution is flow-cast, prevent the solution from permeating to the back surface due to excessive permeation; prevent separation of the microporous support layer from the substrate; prevent the composite semipermeable layer from having a non-uniform thickness due to fluffing, etc. of the substrate; and prevent occurrence of a defect such as pinhole.

In addition, when the substrate is composed of a long-fiber nonwoven fabric constituted by thermoplastic continuous filaments, generation of thickness unevenness and membrane defect, which are caused by fiber fluffing at the time of flow-casting a polymer solution, can be prevented, compared with a short-fiber nonwoven fabric. Furthermore, since tension is applied in the membrane-forming direction to the composite semipermeable layer when the membrane is continuously formed, a long-fiber nonwoven fabric with excellent dimensional stability is preferably used as the substrate.

From the viewpoint of moldability and strength, the long-fiber nonwoven fabric preferably has a structure in which the fibers in a surface layer opposite the support layer are more longitudinally oriented than the fibers in a surface layer on the support layer side. Because of such a structure, strength is maintained and consequently, a high effect of preventing membrane breakage, etc. is achieved. In the case of imparting unevenness to the composite semipermeable layer by embossing, etc., when the substrate is a long-fiber nonwoven fabric, moldability of a laminate including a support layer and a substrate is also enhanced, and the uneven shape of the composite semipermeable layer surface is advantageously stabilized.

The thickness of the substrate is preferably from 50 μm to 150 μm.

[2. Coat Layer]

(2-1) Outline of Coat Layer

The layered semipermeable membrane of the present invention has a coat layer on the surface. In a differential spectrum obtained by subtracting an IR spectrum measured from the coat layer side of the layered semipermeable membrane equilibrated at a temperature of 25° C. and a relative humidity of 3% RH from an IR spectrum measured from the coat layer side of the layered semipermeable membrane equilibrated at a temperature of 25° C. and a relative humidity of 97% RH, the maximum peak intensity between 3,700 cm$^{-1}$ and 2,900 cm$^{-1}$ is 0.08 or more; in a differential spectrum obtained by subtracting an IR spectrum measured from the coat layer side of the layered semipermeable membrane equilibrated at a temperature 25° C. and a relative humidity of 3% RH from an IR spectrum measured from the coat layer side of the layered semipermeable membrane equilibrated at a temperature of 25° C. and a relative humidity of 97% RH, the peak top wavenumber between 3,700 cm$^{-1}$ and 2,900 cm$^{-1}$ is 3,400 cm$^{-1}$ or more and 3,550 cm$^{-1}$ or less; and in the X-ray photoelectron spectroscopic measurement from the coat layer side of the layered semipermeable membrane, an N1s peak appears and the peak has a maximum value at 401 eV or more.

Furthermore, the surface zeta potential at pH 7 on the coat layer side of the layered semipermeable membrane is preferably from −15 mV to +10 mV, more preferably from −15 mV to +5 mV.

As a result of intensive studies, the present inventors have found that water contained in the layered semipermeable membrane affects the fouling resistance. Specifically, the peak at 3,700 to 2,900 cm$^{-1}$ in the differential spectrum obtained by subtracting an IR spectrum measured from the coat layer side of the layered semipermeable membrane equilibrated at a temperature of 25° C. and a relative humidity of 3% RH from an IR spectrum measured from the coat layer side of the layered semipermeable membrane equilibrated at a temperature of 25° C. and a relative humidity of 97% RH represents the stretching vibration of O—H bond of the water molecules contained in the layered semipermeable membrane, and a larger peak indicates that the number of water molecules contained in the layered semipermeable membrane is larger. When the maximum peak intensity between 3,700 cm$^{-1}$ and 2,900 cm$^{-1}$ is 0.08 or more, the fouling resistance is high.

In addition, the differential spectrum obtained by subtracting an IR spectrum measured from the coat layer side of the layered semipermeable membrane equilibrated at a temperature 25° C. and a relative humidity of 3% RH from an IR spectrum measured from the coat layer side of the layered semipermeable membrane equilibrated at a temperature of 25° C. and a relative humidity of 97% RH similarly shows the stretching vibration of O—H bond of water molecules contained in the layered semipermeable membrane, but the water molecules are a water molecule relatively strongly interacted with the layered semipermeable membrane, and when the peak top wavenumber thereof is 3,400 cm$^{-1}$ or more and 3,550 cm$^{-1}$ or less, the fouling resistance is high.

As the method for adjusting the relative humidity at a certain fixed temperature, the saturated salt method described in JIS B 7920 may be used. In addition, the IR spectrum of the layered semipermeable membrane can be measured by the total reflection infrared spectroscopy (ATR).

Furthermore, in Polymer Journal, 23, 513 (1991), it is described that oxidation of a polyamide is significantly accelerated by the coexistence of an oxidizing agent and a heavy metal ion. As a result of intensive studies, the present inventors have found that in the X-ray photoelectron spectroscopic measurement from the coat layer side of the layered semipermeable membrane, when an N1s peak appears and the peak has a maximum value at 401 eV or more, heavy metal ions can be removed by the coat layer and even when an oxidizing agent and a heavy metal ion are present together, acceleration of oxidative deterioration can be prevented, presenting high oxidizing agent resistance.

In the X-ray photoelectron spectroscopic measurement, the chemical state of elements is determined from the chemical shift of a narrow scan by performing a wide scan or a narrow scan. Subsequently, a narrow scan spectrum is determined by peak splitting. In the data processing, the C1s peak position for neutral carbon (CHx) is set to 284.6 eV. At the N1s peak, peak splitting is performed, if desired, and peaks are assigned to respective components.

In addition, when the surface zeta potential at pH 7 on the coat layer side of the layered semipermeable membrane is from −15 mV to +10 mV while having the above-described properties, sticking of a positively charged fouling substance or a negatively charged fouling substance can also be reduced, and higher fouling resistance is advantageously obtained.

Incidentally, the surface zeta potential can be measured by an electrophoretic light-scattering photometer. For example, the layered semipermeable membrane is set in a plate sample cell by arranging the coat layer surface to come into contact with the monitor particle solution and measured. The monitor particle is obtained by coating a polystyrene latex with a hydroxypropyl cellulose, and the particles are dispersed in a 10 mM NaCl solution to make a monitor particle solution. When the pH of the monitor particle solution is adjusted, a zeta potential at a predetermined pH can be measured. As to the electrophoretic light-scattering photometer, for example, ELS-8000 manufactured by Otsuka Electronics Co., Ltd. may be used.

Each embodiment of the coat layer is described below.

(2-2) First Embodiment of Coat Layer (2-2-a) Constitution

In a first embodiment, the coat layer contains a polymer having both of the following structures (I) and (II):

[Chem. 9]

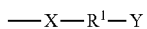 (I)

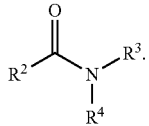 (II)

(wherein X is a positively charged group and is an imidazolium group or a pyridinium group, each of which may have a substituent, $R^1$ is a group selected from an alkylene group having a carbon number of 6 or less, an arylene group, an amido group, and an ether group, each of which may have a substituent, Y is a negatively charged group and is a group selected from the structures shown in (III) below, each of $R^2$, $R^3$ and $R^4$ is independently a group selected from an alkyl group, an alkylene group, an aryl group, and an arylene group, each of which may have a substituent, and any two of $R^2$, $R^3$ and $R^4$ may form a ring);

[Chem. 10]

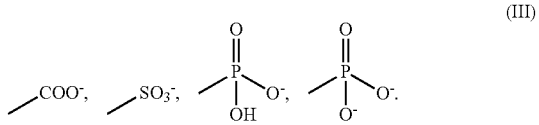 (III)

Preferably, X is an imidazolium group which may have a substituent, $R^1$ is an ethylene group or a propylene group, each of which may have a substituent, and Y is a group selected from the structures of (IV) below:

[Chem. 11]

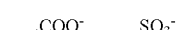 (IV)

The polymer contained in the coat layer contains a copolymer formed by the polymerization of two or more kinds of monomers including at least a compound having structure (I) and a compound having structure (II). The copolymer may be polymerized directly on the semipermeable layer, or a copolymer separately polymerized may be applied by coating onto the semipermeable layer. As for the formation method, any method may be employed, and any known method may be selected.

Furthermore, the copolymer may or may not be chemically bonded to the separation functional layer by a covalent bond, etc. and may contain a crosslinked structure. For example, the copolymer may contain a structure formed by crosslinking a copolymer of a compound having structure (I), a compound having structure (II), and the later-described compound (D), with the later-described crosslinking agent. The proportion of the compounds having structures (I) and (II) in the copolymer is preferably 30 wt % or more, more preferably 50 wt % or more, still more preferably 80 wt % or more.

By having both of structures (I) and (II), in a differential spectrum obtained by subtracting an IR spectrum measured from the coat layer side of the layered semipermeable membrane equilibrated at a temperature of 25° C. and a relative humidity of 3% RH from an IR spectrum measured from the coat layer side of the layered semipermeable membrane equilibrated at a temperature of 25° C. and a relative humidity of 97% RH, the maximum peak intensity between 3,700 cm$^{-1}$ and 2,900 cm$^{-1}$ becomes 0.08 or more, and in a differential spectrum obtained by subtracting an IR spectrum measured from the coat layer side of the layered semipermeable membrane equilibrated at a temperature of 25° C. and a relative humidity of 3% RH from an IR spectrum measured from the coat layer side of the layered semipermeable membrane equilibrated at a temperature of 25° C. and a relative humidity of 97% RH, the peak top wavenumber between 3,700 cm$^{-1}$ and 2,900 cm$^{-1}$ becomes 3,400 cm$^{-1}$ or more and 3,550 cm$^{-1}$ or less.

The coat layer has X of structure (I), whereby in the X-ray photoelectron spectroscopic measurement from the coat layer side of the layered semipermeable membrane, an N1s peak appears and the peak has a maximum value at 401 eV or more.

In addition, by virtue of having an equal number of positively charged groups and negatively charged groups as in structure (I) and having structure (II), the surface zeta potential at pH 7 on the coat layer side of the layered semipermeable membrane becomes from −15 mV to +10 mV.

(2-2-b) Method for Forming Coat Layer of First Embodiment

The step of forming a coat layer constituting the layered semipermeable membrane is described below.

First, a polymer obtained by the polymerization of at least monomers represented by the following structures (V) and (VI) is prepared. The monomers represented by the following structures (V) and (VI) may be the same monomer, that is, structure (VI) may be contained as the structure of R$^5$, or structures (V) and (VI) may be different monomers.

In addition, the polymer above preferably has a moiety capable of forming a bond between the polymers or between the polymer and the polyamide separation functional layer. The moiety capable of forming a bond may be included in the structure (V) or (VI) or may be included in other copolymer components. The bond formed may be a direct bond between the polymers or between the polymer and the polyamide separation functional layer or may be a bond via other structures.

$$R^5-X-R^1-Y \quad (V)$$

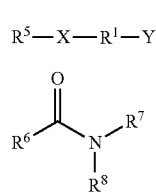
(VI)

X, R$^1$ and Y are as described above, and R$^5$ is a group having an ethylenically unsaturated group. At least one of R$^6$, R$^7$ and R$^8$ is a group having an ethylenically unsaturated group, the remainders are hydrogen or a group selected from an alkyl group, an alkylene group, an aryl group, and an arylene group, each of which may have a substituent, and may be the same or different, and in the case where two of R$^6$, R$^7$ and R$^8$ have no ethylenically unsaturated group, these two groups may form a ring.

The ethylenically unsaturated group is preferably a vinyl group, an allyl group, an acryloyl group, a methacryloyl group, or a styryl group.

The polymerization method is selected from known methods such as radical polymerization, cationic polymerization, anionic polymerization and thermal polymerization, and a polymerization initiator and a solvent suitable for the polymerization method are used. The obtained polymer may be appropriately purified before use.

Then, a solution containing at least the polymer prepared, a compound capable of forming a bond (hereinafter, a crosslinking agent) between the polymers or between the polymer and the polyamide separation functional layer, and the produced polymer is put into contact with the polyamide separation functional layer. The solution may contain other components as long as they do not affect the separation functional layer, the porous support layer and the substrate. In addition, the solvent for preparing the solution may be any solvent as long as it does not affect the separation functional layer, the porous support layer and the substrate, and water or a mixed solution of water and an alcohol is suitably used.

As for the contacting method, a known method may be used and, for example, a method of immersing, in a solvent, a membrane having formed therein the polyamide separation functional layer, or a method of applying a solution onto the polyamide separation functional layer is used.

After being contacted, the polymer is fixed onto the polyamide separation functional layer to form a coat layer. As for the method of fixation, the polymer may be adsorbed or impregnated into the polyamide separation functional layer, the polymer may be chemically bonded to the polyamide separation functional layer, or the polymers may be chemically bonded to each other and thereby be insolubilized and fixed. In consideration of the retentivity•stability of the coat layer, the method of insolubilizing the polymer by chemically bonding the polymer to the polyamide separation functional layer or by chemically bonding the polymers to each other is preferred.

(2-3) Second Embodiment of Coat Layer (2-3-a) Constitution

In another embodiment different from the first embodiment, the coat layer contains a copolymer Y having at least three kinds of repeating unit structures P1, P2 and P3 different from each other, which are a repeating unit structure P1 having structure X1 in its side chain, a repeating unit structure P2 having structure X2 in its side chain, and a repeating unit structure P3 having structure X3 in its side chain.

The copolymer Y contains a polymerized product formed by the polymerization of three or more kinds of monomers including at least the compounds (A), (B) and (C) described below. The proportion of the polymerized product in the coat layer is preferably 80 wt % or more, more preferably 90 wt % or more, still more preferably 95 wt % or more. The coat layer may be constituted only by this polymerized product.

The coat layer contains a copolymer Y formed by the polymerization of three or more kinds of monomers including at least compounds (A), (B) and (C), and the copolymer Y may be polymerized directly on the semipermeable layer, or a copolymer Y separately polymerized may be applied by coating onto the semipermeable layer. As for the formation method thereof, any methods may be employed, and any known methods may be selected.

Compound (A) is described below.

Compound (A) contains a reactive group having an ethylenically unsaturated group. Examples of the reactive group having an ethylenically unsaturated group include a vinyl group, an allyl group, a methacryloxyethyl group, a methacryloxypropyl group, an acryloxyethyl group, an acryloxypropyl group, and a styryl group. In view of polymerizability, a methacryloxypropyl group, an acryloxypropyl group, and a styryl group are preferred. Compound (A) may be sufficient if it has at least one of such reactive groups. In the case where compound (A) has a plurality of such reactive groups, one compound (A) may have a plurality of kinds of reactive groups.

Furthermore, compound (A) has the following structure X1. When compound (A) is contained as a polymerization component, a copolymer Y containing a repeating unit structure P1 having structure X1 in its side chain is produced, as a result, a coat layer to which stains are hard to stick is obtained.

[Chem. 13]

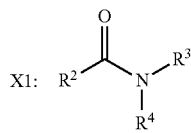

(II)

Each of $R^2$, $R^3$ and $R^4$ is independently a group selected from an alkyl group, an alkylene group, an aryl group, and an arylene group, each of which may have a substituent, and any two of $R^2$, $R^3$ and $R^4$ may form a ring.

Examples of the compound (A) include acrylamide, N-alkylacrylamides such as N-methylacrylamide, N-ethylacrylamide and N-propylacrylamide, N,N-dialkylacrylamides such as N,N-dimethylacrylamide, N,N-diethylacrylamide and N,N-dipropylacrylamide, dimethylaminoethyl(meth)acrylamide, diethylaminoethyl(meth)acrylamide, dimethylaminopropyl(meth)acrylamide, and N-hydroxy(meth)acrylamide.

Compound (B) is described below.

Compound (B) has structure X2. Structure X2 is a negatively charged group. Because of this constitution, a copolymer Y containing a repeating unit structure P2 having structure X2 in its side chain is obtained, and the copolymer Y has a negatively charged group.

Compound (B) is preferably an organic compound. In addition, compound (B) preferably has, as the negatively charged group, at least one functional group selected from a carbo anion, a sulfo anion, and a phosphor anion. Compound (B) may contain two or more negatively charged groups and, inter alia, preferably contains one or two negatively charged groups.

Furthermore, compound (B) contains an ethylenically unsaturated group having addition polymerizability. Examples of compound (B) containing an ethylenically unsaturated group having addition polymerizability include a derivative of ethylene, propylene or styrene; and methacrylic acid, acrylic acid, and a derivative thereof.

Examples of compound (B) having a carbo anion include maleic acid, maleic anhydride, acrylic acid, methacrylic acid, 2-(hydroxymethyl)acrylic acid, 4-(meth)acryloyloxyethyltrimellitic acid and a corresponding anhydride thereof, 10-methacryloyloxydecylmalonic acid, N-(2-hydroxy-3-methacryloyloxypropyl)-N-phenylglycine, 4-vinylbenzoic acid, 3-phenylacrylic acid, and a salt thereof.

Examples of compound (B) having a sulfo anion include vinylsulfonic acid, allylsulfonic acid, 3-(acryloyloxy)propane-1-sulfonic acid, 3-(methacryloyloxy)propane-1-sulfonic acid, 4-methacrylamidobenzenesulfonic acid, 1,3-butadiene-1-sulfonic acid, 2-methyl-1,3-butadiene-1-sulfonic acid, 4-vinylphenylsulfonic acid, 3-(methacrylamido)propylsulfonic acid, and a salt thereof.

Examples of compound (B) having a phosphor anion include vinylphosphonic acid, 4-vinylphenylphosphonic acid, 4-vinylbenzylphosphonic acid, 2-methacryloyloxyethylphosphonic acid, 2-methacrylamidoethylphosphonic acid, 4-methacrylamido-4-methyl-phenyl-phosphonic acid, 2-[4-(dihydroxyphosphoryl)-2-oxa-butyl]-acrylic acid, 2-[2-dihydroxyphosphoryl]ethoxymethyl]-acrylic acid-2,4,6-trimethyl-phenyl ester, and a salt thereof.

Compound (C) is described below. Compound (C) has structure X3. Structure X3 is a positively charged group. Because of this constitution, a copolymer Y having structure X3 in its side chain is obtained, and the copolymer Y has a positively charged group. Compound (C) is preferably an organic compound. In addition, compound (C) preferably has, as the cationic group, an ammonium group, an imidazolium group, or a pyridinium group.

Compound (C) may contain two or more positively charged groups and, inter alia, preferably contains one or two positively charged groups.

Compound (C) contains an ethylenically unsaturated group having addition polymerizability. Examples of compound (C) containing an ethylenically unsaturated group having addition polymerizability include a derivative of ethylene, propylene or styrene; and methacrylic acid, acrylic acid, and a derivative thereof.

Examples of compound (C) having an ammonium group, an imidazolium group or a pyridinium group include at least one compound selected from the group consisting of [2-(methacryloyloxy)ethyl]dimethyl-(3-sulfopropyl)ammonium hydroxide, 1-allyl-3-imidazolium chloride, 1-vinyl-3-imidazolium chloride, 1-allyl-3-imidazolium bromide, 1-vinyl-3-imidazolium bromide, allylamine, N-methylallylamine, 4-aminostyrene, N,N-dimethylallylamine, 4-vinylbenzylamine, dimethylaminoethyl methacrylate, dimethylaminoethyl acrylate, dimethylaminomethyl methacrylate, dimethylaminomethyl acrylate, dimethylaminopropyl methacrylate, dimethylaminopropyl acrylate, dimethylaminobutyl methacrylate, dimethylaminobutyl acrylate, diethylaminoethyl methacrylate, diethylaminoethyl acrylate, diethylaminopropyl methacrylate, diethylaminopropyl acrylate, diethylaminobutyl methacrylate, diethylaminobutyl acrylate, 1-vinylpyridine, 2-vinylpyridine, 3-vinylpyridine, 4-vinylpyridine, 1-vinylimidazole, 2-vinylimidazole, 4-vinylimidazole, 5-vinylimidazole, 1-allylimidazole, vinylpyrrolidone, 2-vinyloxazole, and 2-vinyl-2-oxazoline, its derivative, and a salt thereof.

In the case where compounds (B) and (C) are used, the coat layer has a positively charged group together with a negatively charged group, and the charge on the membrane surface is neutralized. This is advantageous in that a heavy metal, etc. is prevented from sticking to the membrane surface. Furthermore, by having a charged group, hydrophilicity of the coat layer is enhanced, and good water permeability can be achieved when using the membrane.

Note that the repeating unit structure P2 does not have a positively charged group in its side chain simultaneously, and the repeating unit structure P3 does not have a negatively charged group in its side chain simultaneously. In addition, compound (B) does not have a positively charged group simultaneously, and compound (C) does not have a negatively charged group simultaneously.

The copolymer Y may further contain a crosslinked structure. When part or the whole of the copolymer Y contains a crosslinked structure, the coat layer is firmly fixed on the semipermeable layer. In addition, when the coat layer contains a crosslinked structure, excessive swelling is prevented when using the membrane, and the effect of removing a heavy metal can be enhanced. The crosslinked structure may be formed via an arbitrary structure moiety possessed by the copolymer Y, and this is not particularly limited, but by further containing the below-described compound (D) as a polymerization component, a copolymer Y further having a repeating unit structure P4 having structure X4 in its side chain is obtained, and a coat layer in which part or the whole of the copolymer Y is crosslinked via structure X4 can be obtained.

In the case where the coat layer contains a crosslinked structure, the formation method thereof is not particularly limited, and any known methods can be selected. The crosslinked structure only has to be formed via an arbitrary structure moiety possessed by the copolymer Y.

For example, in the case of applying the copolymer Y by coating onto the semipermeable layer to form the coat layer, various crosslinking agents are dissolved in a coating solution in advance together with the copolymer Y and the coating solution is applied to form a liquid membrane on the semipermeable layer, thereafter a reaction of the copolymer Y with the crosslinking agent may be caused to proceed by an external stimulation such as heating or light irradiation, thereby effecting crosslink formation. In addition, in the case of forming a crosslink directly between functional groups possessed by the copolymer Y, a crosslinking agent may not be added.

Compound (D) is described below.

Compound (D) has an amino group, a hydroxyl group or a thiol group and an ethylenically unsaturated group and is a compound other than compounds (A), (B) and (C). Copolymers Y can be crosslinked to each other via an amino group, a hydroxyl group or a thiol group possessed by the compound (D). In the case where the copolymer Y is crosslinked via a hydroxyl group, structure X4 necessarily contains oxygen atom; in the case where the copolymer Y is crosslinked via an amino group, structure X4 necessarily contains nitrogen atom; and in the case where the copolymer Y is crosslinked via a thiol group, structure X4 necessarily contains sulfur atom.

Compound (D) contains an ethylenically unsaturated group having addition polymerizability. Examples of compound (D) containing an ethylenically unsaturated group having addition polymerizability include a derivative of ethylene, propylene or styrene; and methacrylic acid, acrylic acid, and a derivative thereof.

Furthermore, compound (D) may have two or more amino groups, hydroxyl groups or thiol groups. The amino group may be a primary or secondary amino group.

Examples of compound (D) include, specifically, acrylic acid, methacrylic acid, vinyl alcohol, hydroxyethyl acrylate, hydroxypropyl acrylate, hydroxyethyl methacrylate, hydroxypropyl methacrylate, hydroxyethylacrylamide, hydroxypropylacrylamide, vinylbenzoic acid, vinylphenol, vinylamine, and vinylaniline.

In either coat layer of first and second embodiments, polymers may together form a crosslinked structure via structure X2 (negatively charged group) or an amino group, a hydroxyl group or thiol group possessed by compound (D). This crosslinked structure may be formed by a direct elimination reaction of an amino group, a hydroxyl group or a thiol group possessed by compound (D), or amino groups, hydroxyl groups or thiol groups possessed by compound (D) may be crosslinked to each other via a crosslinking agent. Furthermore, at this time, a catalyst such as condensing agent may be utilized so as to appropriately accelerate the crosslinking reaction, or the pH may be adjusted to a suitable range. The catalyst may finally remain in the membrane or may be distilled off along with use.

As for the crosslinking agent preferably used in the present invention, for example, a commercially available melamine-based crosslinking agent or a Michael addition reaction-type crosslinking agent such as divinylsulfone and bisvinylsulfone compound may be appropriately selected. Various crosslinked structures may be formed according to the use or non-use of a crosslinking agent or the chemical structure of the crosslinking agent used, but an addition reaction-type crosslinked structure insusceptible to deterioration by hydrolysis is preferred, and it is preferable to use, for example, a Michael addition reaction-type crosslinking agent such as divinylsulfone or bisvinylsulfone compound.

At the time of forming a crosslink via structure X4 contained in the copolymer Y by using a divinylsulfone or bisvinylsulfone compound as the crosslinking agent, the crosslinked structure takes a structure of X4-Q-X4, and Q takes the following structure.

[Chem. 14]

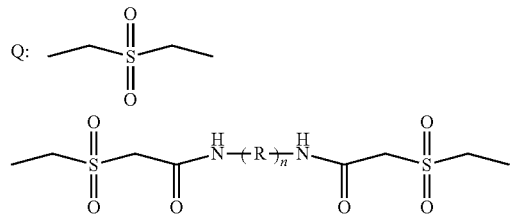

R is a hydrocarbon group, and n is an integer of 0 or more and 5 or less.

The presence of a crosslinked structure can be confirmed by various analyses. Specifically, examples thereof include FT-IR, solid NMR, and X-ray photoelectron spectroscopic measurement. For example, in the case of using divinylsulfone as the crosslinking agent, as the crosslinking reaction progresses, an O=S=O structure is formed in the structure of the crosslinked polymer, so that the presence or absence of a crosslinked structure can be confirmed by inspecting the presence or absence of the structure moiety above. Also in the case where an O=S=O structure is contained in the polymer before crosslinking, the progress of crosslinking can be confirmed by the increase of peak intensity of the target peak. For example, in the case of confirming the presence of O=S=O structure, this may be attained by confirming two kinds of peaks of asymmetric vibration and symmetric vibration of O=S=O.

The thickness of the coat layer formed on the semipermeable layer can be confirmed on a cross-sectional photograph, etc. by a scanning electron microscope. The thickness of the coat layer is preferably 50 nm or more, more preferably 100 nm or more. As the thickness of the coat layer is thicker, the effect of chlorine resistance is higher, and therefore, the upper limit is not particularly important as long as water permeability of the layered semipermeable membrane is secured. However, usually, the upper limit is preferably 1,000 nm or less, more preferably 500 nm or less. When the coat layer is thinned in this range, the separation performance can be exerted without significantly compromising water permeability of the semipermeable layer, and the coat layer can faultlessly cover the semipermeable layer to impart oxidizing agent resistance.

The chemical structure of the coat layer formed on the semipermeable layer can be determined by nuclear magnetic resonance spectroscopy (NMR). The chemical structure can be determined by assigning signals in solution NMR measurement of the polymer or solid NMR measurement of the membrane, and calculating the copolymerization ratio of the compounds (A), (B) and (C) or the compounds (A), (B), (C) and (D) based on the signal areas. The copolymerization ratio of the compound (B) and the compound (C) is preferably from 45:5 to 5:45. When the copolymerization ratio of the compound (B) having a negatively charged group and the compound (C) having a positively charged group is within the range above, the surface potential of the membrane is rendered neutral or nearly neutral. As a result, sticking of heavy metal to the layered semipermeable membrane can be prevented.

The copolymerization ratio can be controlled by selecting monomers based on Q value and e value or changing, or by changing the monomer concentration in the reaction solution, the time of polymerization or the reaction time during polymerization.

The Q value (also called "Alfrey-Price Q value") was presented by T. Alfrey and C. C. Price in 1948 as an indicator of the degree of conjugation between a double bond of a radical-polymerizable monomer and its substituent, together with e value that is an indicator of the electron density of the double bond. Using styrene as a reference (Q=1.0, e=−0.8), Q value and e value have been determined experimentally for a large number of monomers.

The Q values and e values of representative monomers are summarized, for example, in J. Brandrup, E. H. Immergut, and E. A. Grulke, *Polymer Handbook*, (U.S.A.), 4th edition, John Wiley & Sons Inc., 1999, pp. II/181-II/319, and the values may be determined by reference thereto or may be derived by the following method.

As the method for deriving the Q value and e value of monomer $M_1$, first, the monomer $M_1$ is polymerized with monomer $M_2$ having known Q and e values in various molar ratios ($F=[M_1]/[M_2]$). At this time, the consumption ratio between respective monomers ($f=d[M_1]/d[M_2]$) in the initial stage of polymerization is calculated from measurement data obtained by gas chromatography, etc. It is known that F and f satisfy the relationship of formula (α), and when $F(f−1)/f$ is plotted against $F^2/f$ and approximated by a straight line, the copolymerization reactivity ratios $r_1$ and $r_2$ can be determined from the values of slope and ordinate intercept of the straight line.

$$F(f-1)/f = r_1 F^2/f - r_2 \qquad \text{formula } (\alpha)$$

The copolymerization reactivity ratios $r_1$ and $r_2$ and the Q value and e value ($Q_2$ and $e_2$) of monomer $M_2$ are substituted into formulae (β) and (γ) presented by T. Alfrey and C. C. Price, and the Q value ($Q_1$) and e value ($e_1$) of monomer $M_1$ can thereby be derived.

$$r_1 = (Q_1/Q_2)\exp[-e_1(e_1-e_2)] \qquad \text{formula } (\beta)$$

$$r_2 = (Q_2/Q_1)\exp[-e_2(e_2-e_1)] \qquad \text{formula } (\gamma)$$

Details of this method can be known with reference to Literature 1 (M. Fineman et al., Journal of Polymer Science, Vol. 5. p. 269, John Wiley & Sons Inc., 1950) and Literature 2 (Takayuki Otsu, Kaitei Kobunshi Gosei No Kagaku (Revised version, Chemistry of Polymer Synthesis), pp. 111-116, Kagaku-Dojin Publishing Company, Inc., 1992).

When the Q values and e values of monomers used can be known beforehand, it is possible to derive the copolymerization reactivity ratios based on these values and predict a copolymer composition based on the derived values. Although possible copolymer compositions include random, block, alternating, monomers having Q and e values for giving a suitable copolymerization composition ratio can freely be selected depending on the copolymer composition of interest. The copolymer Y in the present invention may be any of a random copolymer, an alternating copolymer and a block copolymer, may have a nonlinear structure such as star shape or comb shape, and furthermore, may include a crosslinked structure.

Based on the Q values and e values of monomers to be used, the monomer charge rate may be controlled to give a desired monomer introduction rate, or an appropriate monomer structure may be selected to obtain a polymerized product having a desired copolymerization composition. Furthermore, the hydration water amount or hydration water mobility on the coat layer surface may be appropriately controlled by appropriately adjusting the copolymerization composition, the polymer molecular weight, or the polymer crosslinking degree. By appropriately adjusting the hydration water amount or hydration water mobility, a coat layer having desired fouling resistance can be obtained.

Information on the hydration water amount or hydration water mobility on the membrane surface can be obtained by analysis such as IR, DSC, XPS and potential measurement. For example, the hydration water amount and hydration water mobility can be known by IR measurement of the stretching vibration of O—H group of the water molecules present on the membrane surface. The water molecule present on the membrane surface shows a peak in the wavenumber band of approximately from 2,700 to 3,700 $cm^{-1}$ due to difference in its mobility. A peak, at which the value of wavenumber is larger, indicates a water molecule having lower mobility. The water molecule on the membrane surface can be classified into bound water with low mobility, intermediate water with medium mobility, and free water with high mobility, according to the difference in mobility.

Generally, in a coat layer having a moisture content of less than 10%, the proportion of bound water in the number of water molecules on the surface is high. A coat layer having a moisture content of 10% or more and less than 90% has intermediate water together with bound water. A coat layer having a moisture content of 90% or more has free water together with bound water and intermediate water. The hydration water amount can be determined from the peak intensity in the range of 2,700 to 3,700 $cm^{-1}$, and the hydration water mobility can be determined from the peak top wavenumber.

Specifically, in a differential spectrum obtained by subtracting an IR spectrum measured from the coat layer side of the layered semipermeable membrane equilibrated at a temperature of 25° C. and a relative humidity of 3% RH from an IR spectrum measured from the coat layer side of the layered semipermeable membrane equilibrated at a temperature of 25° C. and a relative humidity of 97% RH, the maximum peak intensity between 3,700 $cm^{-1}$ and 2,900 $cm^{-1}$ becomes 0.08 or more, and in a differential spectrum obtained by subtracting an IR spectrum measured from the coat layer side of the layered semipermeable membrane equilibrated at a temperature of 25° C. and a relative humidity of 3% RH from an IR spectrum measured from the coat layer side of the layered semipermeable membrane equilibrated at a temperature of 25° C. and a relative humidity of 97% RH, the peak top wavenumber between 3,700 $cm^{-1}$ and 2,900 $cm^{-1}$ becomes 3,400 $cm^{-1}$ or more and 3,550 $cm^{-1}$ or less.

Because of the constitution of the coat layer having the structure X3, in the X-ray photoelectron spectroscopic measurement from the coat layer side of the layered semipermeable membrane, an N1s peak appears, and the peak has a maximum value at 401 eV or more.

In addition, because of the constitution of the coat layer having both of the structures X2 and X3, the surface zeta potential at pH 7 on the coat layer side of the layered semipermeable membrane becomes from −15 mV to +10 mV.

EXAMPLES

The present invention is described more specifically below by referring to Examples, but the present invention is not limited by these Examples.

In Comparative Examples and Examples, the IR spectrum, the X-ray photoelectron spectroscopic measurement of composite semipermeable membrane, and the surface zeta potential at pH 7 were measured as follows.

(Equilibration of Composite Semipermeable Membrane Under Given Temperature and Relative Humidity Conditions)

The relative humidity of air in equilibrium with a saturated aqueous salt solution is determined by the type of the salt and the temperature of the solution. Accordingly, when a vessel containing the saturated aqueous salt solution is kept at a given temperature, an equilibrium state can be reached, and a predetermined relative humidity can be generated. Relative humidities corresponding to various salts are shown in Table 1. The method of adjusting the relative humidity in this way is called a saturated salt method and is described also in JIS B 7920.

In this experiment, the relative humidity was adjusted using the saturated salt method, and the composite semipermeable membrane was thereby equilibrated. Specifically, about 200 mL of a saturated salt solution was put in a 2.7 L-volume vessel, and a membrane (area: about 2 cm$^2$) having immersed in water was placed therein in the wet state while keeping it away from contacting with the saturated salt solution. The vessel was then sealed and left standing still in an incubator at 25° C. for 30 days.

TABLE 1

| Salt | Relative Humidity (25° C.) | |
|---|---|---|
| | % RH | Error |
| Lithium chloride | 11.3 | 0.3 |
| Sodium bromide | 57.6 | 0.4 |
| Potassium sulfate | 97.3 | 0.5 |

(Infrared Absorption Spectrum (IR Spectrum))

The IR spectrum was measured by the total reflection infrared spectroscopy (ATR). The sample surface was measured using, as the measuring machine, Avatar 360 FT-IR spectrometer manufactured by Nicolet Instrument Inc., and using, as accessories for total reflection spectroscopy, a single reflection type horizontal ATR spectrometer (OMNI-Sampler) and a germanium-made ATR crystal, both of which are manufactured by the same company.

As for measurement conditions, the resolution was set to 4 cm$^{-1}$, and the number of times of scanning was set to 256. The composite semipermeable membrane equilibrated under the above-described conditions was taken out and immediately measured. In addition, the obtained spectrum was expressed in terms of absorbance and subjected to automatic baseline correction.

(X-Ray Photoelectron Spectroscopy)

The composite semipermeable membrane was dried under room temperature in vacuum and measured using X-ray photoelectron spectrometer SSX-100 manufactured by U.S. SSI under the conditions of excited X-rays of aluminum Kα1 ray and Kα2 ray (1486.6 eV), an X-ray output of 10 kV 20 mV and a photoelectron escape angle of 35°. In data processing, the C1s peak position for neutral carbon (CHx) was set to 284.6 eV.

(Surface Zeta Potential)

The composite semipermeable membrane was washed with ultrapure water, set in a plate sample cell by arranging the separation functional layer surface of the composite semipermeable membrane to come into contact with the monitor particle solution, and measured by means of an electrophoretic light-scattering photometer (ELS-8000) manufactured by Otsuka Electronics Co., Ltd. As the monitor particle solution, a measurement solution prepared by dispersing polystyrene latex monitor particles in a 10 mM NaCl solution adjusted to pH of 7 was used. As for the light source, a He—Ne laser was used.

Preparation, performance evaluation, fouling resistance and chlorine resistance of the membrane are described below.

First Embodiment of Coat Layer (NaCl Rejection Ratio)

A sodium chloride solution having a salt concentration of 1,000 mg/L and being adjusted to a temperature of 25° C. and pH of 7 was supplied to a semipermeable membrane (including a polymer layered semipermeable membrane) at an operation pressure of 1 MPa to conduct a membrane filtration treatment.

The permeate obtained was measured for the sodium chloride concentration, and the salt rejection ratio was determined based on the measurement results according to the following formula:

Salt rejection ratio (%)=100×{1−[(sodium chloride concentration in permeate)/(sodium chloride concentration in feed water)]}

In addition, the membrane permeation flux (m$^3$/m$^2$/day) was determined from the permeation amount (m$^3$) per day per square meter of the membrane surface obtained under the above-described conditions.

(Fouling Resistance)

After the evaluation above of salt rejection ratio and permeation flux, polyoxyethylene (10) octyl phenyl ether was added to the sodium chloride solution to give a concentration of 100 mg/l, and the resulting solution was filtered for 1 hour. Subsequently, the permeation flux was measured, and the ratio thereof to the initial permeation flux was calculated.

(Chlorine Resistance)

A semipermeable membrane or a polymer layered semipermeable membrane was immersed in an aqueous sodium hypochlorite solution containing 1 mg/L of copper(II) chloride and being adjusted to a chlorine concentration of 500 mg/L, for 15 hours and measured for the above-described salt rejection ratio and membrane permeation flux. As an indicator of chlorine resistance, the ratio of change in salt permeability was determined according to the following formula:

Ratio of change in salt permeability=salt permeability after chlorine resistance test/salt permeability of initial performance (Preparation of Coat Layer Polymer)

Reference Example 1

A mixed aqueous solution containing, as monomers, 50 mM (3-vinylimidazolio) acetate, 50 mM N,N-dimethylacrylamide, and 50 mM N-hydroxyethylacrylamide and containing, as a photopolymerization initiator, 10 mM 2,2-dimethoxy-2-phenylacetophenone was irradiated with an ultraviolet ray of 365 nm by an UV irradiator to obtain a polymer solution. The irradiation intensity of the UV irradiator was set such that the value measured with a cumulative ultraviolet dosimeter becomes 20 mW/cm$^2$.

Reference Examples 2 to 9

Polymer solution were obtained in the same manner as in Reference Example 1 except that monomers shown in Table 2 were used in place of monomers described in Reference Example 1.

Reference Example 10

A mixed aqueous solution containing, as monomers, 100 mM N,N-dimethylacrylamide and 50 mM N-hydroxyethylacrylamide and containing, as a photopolymerization initiator, 10 mM 2,2-dimethoxy-2-phenylacetophenone was irradiated with an ultraviolet ray of 365 nm by an UV irradiator to obtain a polymer solution.

The irradiation intensity of the UV irradiator was set such that the value measured with a cumulative ultraviolet dosimeter becomes 20 mW/cm$^2$.

Reference Example 11

A mixed aqueous solution containing, as monomers, 100 mM (3-vinylimidazolio)butanoate and 50 mM N-hydroxyethylacrylamide and containing, as a photopolymerization initiator, 10 mM 2,2-dimethoxy-2-phenylacetophenone was irradiated with an ultraviolet ray of 365 nm by an UV irradiator to obtain a polymer solution.

The irradiation intensity of the UV irradiator was set such that the value measured with a cumulative ultraviolet dosimeter becomes 20 mW/cm$^2$.

Comparative Example 1: Polyamide Semipermeable Membrane

On a polyethylene terephthalate nonwoven fabric as a substrate, a 16 wt % dimethylformamide solution of polysulfone was cast at room temperature (25° C.) to a thickness of 200 μm. Immediately after the casting, the cast product was immersed in pure water and left standing for 5 minutes to prepare a support membrane including a substrate and a support layer.

The thus-obtained support membrane was immersed in an aqueous 2.5 wt % metaphenylenediamine solution for 1 minute and after slowly pulling up the support membrane in the vertical direction and spraying nitrogen through an air nozzle to remove an excess aqueous solution from the support membrane surface, an n-decane solution containing 0.08 wt % of trimesoyl chloride was applied to completely wet the surface, followed by standing still for 30 seconds.

Subsequently, in order to remove an excess solution from the membrane, the membrane was held vertically for 1 minute to drain the solution, and n-decane on the membrane surface was removed at room temperature by an air blower. The membrane was then washed with hot water at 90° C. for 2 minutes to obtain a semipermeable membrane. The performance, fouling resistance and chlorine resistance of the obtained semipermeable membrane resulted in the values shown in Table 3. The IR spectrum, XPS (X-ray photoelectron spectroscopy) and zeta potential under moisture conditioning of the obtained semipermeable membrane resulted in the values shown in Table 4.

Comparative Example 2

A solution of isopropanol/water (mixed in a weight ratio of 3/7) containing 0.25 wt % of polyvinyl alcohol (degree of polymerization: 2,000, degree of saponification: ≥99%) was applied onto the semipermeable membrane obtained in Comparative Example 1 and after removing the excess solution by spin coating, the membrane was held in a hot-air drier at 130° C. for 5 minutes to obtain a layered semipermeable membrane coated with polyvinyl alcohol.

The performance, fouling resistance and chlorine resistance of the obtained layered semipermeable membrane resulted in the values shown in Table 3. In addition, the IR spectrum, XPS and zeta potential under moisture condition-

TABLE 2

|  | Monomer 1 | Monomer 2 | Monomer 3 |
|---|---|---|---|
| Reference Example 1 | (3-vinylimidazolio) acetate | N,N-dimethylacrylamide | N-hydroxyethylacrylamide |
| Reference Example 2 | (3-vinylimidazolio) acetate | N,N-dimethylacrylamide | 2-aminoethyl acrylate |
| Reference Example 3 | (3-vinylimidazolio) butanoate | N,N-dimethylacrylamide | N-hydroxyethylacrylamide |
| Reference Example 4 | 3-(3-vinylimidazolio) propanesulfonate | N,N-dimethylacrylamide | N-hydroxyethylacrylamide |
| Reference Example 5 | (3-vinylimidazolio) acetate | N-vinylpyrrolidone | N-hydroxyethylacrylamide |
| Reference Example 6 | [2-(methacryloyloxy) ethyl] dimethyl-(3-sulfopropyl) ammonium hydroxide | N,N-dimethylacrylamide | N-hydroxyethylacrylamide |
| Reference Example 7 | 2-methacryloyloxyethyl phosphorylcholine | N,N-dimethylacrylamide | N-hydroxyethylacrylamide |
| Reference Example 8 | 1-methyl-3-vinylimidazolium iodide | N,N-dimethylacrylamide | N-hydroxyethylacrylamide |
| Reference Example 9 | sodium styrenesulfonate | N,N-dimethylacrylamide | N-hydroxyethylacrylamide |
| Reference Example 10 | none | N,N-dimethylacrylamide | N-hydroxyethylacrylamide |
| Reference Example 11 | (3-vinylimidazolio) butanoate | none | N-hydroxyethylacrylamide | ing of the obtained layered semipermeable membrane resulted in the values shown in Table 4.

(Comparative Example 3)

An aqueous 0.1 wt% poly(2-ethyl-2-oxazoline) (molecular weight: 500,000) solution was applied onto the semipermeable membrane obtained in Comparative Example 1 and after removing the excess solution by spin coating, the membrane was held in a hot-air drier at 65° C. for 50 seconds to obtain a layered semipermeable membrane coated with poly (2-ethyloxazoline).

The performance, fouling resistance and chlorine resistance of the obtained layered semipermeable membrane resulted in the values shown in Table 3. In addition, the IR spectrum, XPS and zeta potential under moisture conditioning of the obtained layered semipermeable membrane resulted in the values shown in Table 4.

(Example 1)

A mixed aqueous solution prepared by adding divinylsulfone to an aqueous solution containing 3% of the polymer obtained in Reference Example 1 to account for 1% was applied onto the semipermeable membrane obtained in Comparative Example 1 and after removing the excess solution by spin coating, the membrane was held in a hot-air drier at 80° C. for 3 minutes to obtain a polymer-coated layered semipermeable membrane.

The performance, fouling resistance and chlorine resistance of the obtained layered semipermeable membrane resulted in the values shown in Table 3. In addition, the IR spectrum, XPS and zeta potential under moisture conditioning of the obtained layered semipermeable membrane resulted in the values shown in Table 4.

(Example 2)

A mixed aqueous solution prepared by adding divinylsulfone to an aqueous solution containing 3% of the polymer obtained in Reference Example 2 to account for 1% was applied onto the semipermeable membrane obtained in Comparative Example 1 and after removing the excess solution by spin coating, the membrane was held in a hot-air drier at 80° C. for 3 minutes to obtain a polymer-coated layered semipermeable membrane.

The performance, fouling resistance and chlorine resistance of the obtained layered semipermeable membrane resulted in the values shown in Table 3. In addition, the IR spectrum, XPS and zeta potential under moisture conditioning of the obtained layered semipermeable membrane resulted in the values shown in Table 4.

Examples 3 to 6 and Comparative Examples 4 to 8

Membrane formation was performed under the same conditions as in Example 1 except that aqueous solutions all different were used in respective Examples, i.e., an aqueous solution of Reference Example 3 in Example 3, an aqueous solution of Reference Example 4 in Example 4, an aqueous solution of Reference Example 5 in Example 5, and an aqueous solution of Reference Example 6 in Example 6.

Incidentally, membrane formation was performed under the same conditions as in Example 1 except for using an aqueous solution of Reference Example 7 in Comparative Example 4, an aqueous solution of Reference Example 8 in Comparative Example 5, an aqueous solution of Reference Example 9 in Comparative Example 6, an aqueous solution of Reference Example 10 in Comparative Example 7, and an aqueous solution of Reference Example 11 in Comparative Example 8.

As seen from Examples, the composite semipermeable membrane having the constitution of the present application has high chlorine resistance and low fouling propensity.

TABLE 3

| | Initial Performance | | After Chlorine Resistance Test | | After Fouling Resistance Test Permeation Flux |
|---|---|---|---|---|---|
| | Salt Rejection Ratio (%) | Permeation Flux ($m^3/m^2/d$) | Salt Rejection Ratio (%) | Permeation Flux ($m^3/m^2/d$) | Retention Rate F2/F1 (%) |
| Comparative Example 1 | 99.2 | 0.72 | 80.1 | 1.1 | 56 |
| Comparative Example 2 | 99.2 | 0.6 | 80 | 1.1 | 70 |
| Comparative Example 3 | 99.2 | 0.5 | 80 | 1.1 | 75 |
| Example 1 | 99.25 | 0.62 | 95 | 0.8 | 80 |
| Example 2 | 99.2 | 0.6 | 94.5 | 0.85 | 82 |
| Example 3 | 99.22 | 0.58 | 94 | 0.82 | 81 |
| Example 4 | 99.3 | 0.59 | 93 | 0.84 | 78 |
| Example 5 | 99.2 | 0.55 | 93.5 | 0.78 | 76 |
| Example 6 | 99.2 | 0.63 | 92 | 0.86 | 81 |
| Comparative Example 4 | 99.2 | 0.6 | 84 | 0.88 | 72 |
| Comparative Example 5 | 99.22 | 0.63 | 83.5 | 0.87 | 65 |
| Comparative Example 6 | 99.2 | 0.64 | 81 | 0.9 | 65 |
| Comparative Example 7 | 99.15 | 0.55 | 80 | 0.95 | 70 |
| Comparative Example 8 | 99.24 | 0.62 | 84.5 | 0.92 | 70 |

TABLE 4

| | Maximum Peak Intensity (-) | Peak Top Wavenumber ($cm^{-1}$) | N1s Peak Position (eV) | Surface Zeta Potential (mV) |
|---|---|---|---|---|
| Comparative Example 1 | 0.3 | 3385 | 399 | −30 |
| Comparative Example 2 | 0.07 | 3330 | 399 | −20 |
| Comparative Example 3 | 0.06 | 3450 | 399 | −5 |
| Example 1 | 0.14 | 3410 | 401 | −10 |
| Example 2 | 0.1 | 3410 | 402 | −15 |
| Example 3 | 0.08 | 3420 | 401 | −5 |
| Example 4 | 0.13 | 3450 | 401 | 5 |
| Example 5 | 0.09 | 3400 | 403 | 10 |
| Example 6 | 0.15 | 3550 | 401 | −8 |
| Comparative Example 4 | 0.08 | 3400 | 399 | −5 |
| Comparative Example 5 | 0.06 | 3390 | 401 | 5 |
| Comparative Example 6 | 0.2 | 3560 | 399 | −45 |
| Comparative Example 7 | 0.05 | 3400 | 399 | −18 |
| Comparative Example 8 | 0.08 | 3430 | 402 | 0.5 |

Second Embodiment of Coat Layer

[1. Preparation of Membrane]

(Comparative Example 9) Polyamide Semipermeable Membrane

On a polyethylene terephthalate nonwoven fabric as a substrate, a 16 wt % dimethylformamide solution of polysulfone was cast at room temperature (25° C.) with a thickness of 200 µm. Immediately after the casting, the cast product was immersed in pure water and left standing for 5 minutes to prepare a support membrane including a substrate and a support layer.

The thus-obtained support membrane was immersed in an aqueous 2.5 wt % metaphenylenediamine solution for 1 minute and after slowly pulling up the support membrane in the vertical direction and spraying nitrogen through an air nozzle to remove an excess aqueous solution from the support membrane surface, an n-decane solution containing 0.08 wt % of trimesoyl chloride was applied to completely wet the surface, followed by standing still for 30 seconds.

Subsequently, in order to remove an excess solution from the membrane, the membrane was held vertically for 1 minute to drain the solution, and n-decane on the membrane surface was removed at room temperature by an air blower. The membrane was then washed with hot water at 90° C. for 2 minutes to obtain a semipermeable membrane.

Comparative Example 10

50 mM dimethylacrylamide as compound (A), 50 mM sodium styrenesulfonate as compound (B), 50 mM 1-vinyl-3-imidazolium chloride as compound (C), and 50 mM hydroxyethylacrylamide as compound (D) were dissolved in water, and furthermore, 2,2-dimethoxy-2-phenylacetophenone as a photopolymerization initiator was dissolved in water at a concentration of 10 mM.

The thus-obtained solution was irradiated with an ultraviolet ray of 365 nm by an UV irradiator to obtain a polymer solution for forming a coat layer. The irradiation intensity of the UV irradiator was set such that the value measured with a cumulative ultraviolet dosimeter becomes 40 mW/cm$^2$.

In this polymer solution, divinylsulfone was dissolved as a crosslinking agent at a concentration of 50 mM, and after the solution was put into contact with the support membrane of Comparative Example 1 for 30 seconds, an excess solution was removed by a spin coater to form a layer of the polymer solution on the support membrane.

Subsequently, the semipermeable membrane having formed therein the polymer solution layer was held in a hot-air drier at 100° C. for 5 minutes, allowing a crosslinking reaction to proceed, and a polymer layered semipermeable membrane was thus obtained. The thickness of the coat layer of the polymer layered semipermeable membrane was calculated by observing a cross-section of a sample after vacuum-drying of a membrane piece with a scanning electron microscope and averaging the thicknesses at major 10 points, as a result, the thickness was 300 nm.

Comparative Example 11

50 mM dimethylacrylamide as compound (A), 50 mM sodium styrenesulfonate as compound (B), 50 mM 1-vinyl-3-imidazolium chloride as compound (C), and 50 mM hydroxyethylacrylamide as compound (D) were dissolved in water, and furthermore, 2,2-dimethoxy-2-phenylacetophenone as a photopolymerization initiator was dissolved in the water at a concentration of 10 mM.

The thus-obtained solution was irradiated with an ultraviolet ray of 365 nm by an UV irradiator to obtain a polymer solution for forming a coat layer. The irradiation intensity of the UV irradiator was set such that the value measured with a cumulative ultraviolet dosimeter becomes 40 mW/cm$^2$.

This polymer solution was put into contact with the support membrane of Comparative Example 1 for 30 seconds, and an excess solution was then removed by a spin coater to form a layer of the polymer solution on the support membrane.

Subsequently, the semipermeable membrane having formed therein the polymer solution layer was held in a hot-air drier at 100° C. for 5 minutes to remove the solvent, and a polymer layered semipermeable membrane was thereby obtained. The thickness of the coat layer of the polymer layered semipermeable membrane was calculated by observing a cross-section of a sample after vacuum-drying of a membrane piece with a scanning electron microscope and averaging the thicknesses at major 10 points, as a result, the thickness was 300 nm.

(Examples 7 to 12) Polymer Layered Semipermeable Membrane

Compounds (A), (B), (C) and (D) were dissolved each at the concentration and proportion shown in Table 5, and furthermore, 2,2-dimethoxy-2-phenylacetophenone as a photopolymerization initiator was dissolved in the water at a concentration of 10 mM.

The thus-obtained solution was irradiated with an ultraviolet ray of 365 nm by an UV irradiator to obtain a polymer solution for forming a coat layer. The irradiation intensity of the UV irradiator was set such that the value measured with a cumulative ultraviolet dosimeter becomes 40 mW/cm$^2$.

In Examples 7 to 11, divinylsulfone was dissolved as a crosslinking agent at a concentration of 50 mM in the polymer solution above, and after the solution was put into contact with the polyamide semipermeable membrane (semipermeable layer) of Comparative Example 1 for 30 seconds, an excess solution was removed by a spin coater to form a layer of the polymer solution on the polyamide semipermeable membrane.

In Example 12, the polymer solution was put into contact with the polyamide semipermeable membrane (semipermeable layer) of Comparative Example 9 for 30 seconds, and an excess solution was then removed by a spin coater to form a layer of the polymer solution on the polyamide semipermeable membrane.

The thickness of the polymer solution applied was made equal among Examples 7 to 12 by appropriately adjusting the rotation speed of the spin coater.

Subsequently, the semipermeable membrane having formed therein the polymer solution layer was held in a hot-air drier at 100° C. for 5 minutes, thereby allowing a crosslinking reaction to proceed in Examples 7 to 11 or removing the solvent in Example 12, and a polymer layered semipermeable membrane was thereby obtained.

The thickness of the coat layer of the polymer layered semipermeable membrane was calculated by observing a cross-section of a sample after vacuum-drying of a membrane piece with a scanning electron microscope and averaging the thicknesses at major 10 points, as a result, the thickness was 300 nm in all membranes.

The presence of a crosslinked structure was confirmed by FT-IR measurement. In Examples 1 to 5, asymmetric vibration and symmetric vibration peaks of O=S=O were observed at 1,307 cm$^{-1}$ and 1,130 cm$^{-1}$, respectively. The presence of a crosslinked structure was thus confirmed.

With respect to the polymer layered semipermeable membranes obtained in this way, the initial performance (permeation flux, salt rejection ratio) immediately after preparation, the performance (permeation flux, salt rejection ratio, ratio of change in salt permeability) after chlorine resistance text, and the performance (permeation flux, permeation flux retention rate) after fouling resistance test are shown in Table 6.

On the other hand, in Example 7, the coat layer of Comparative Example 10 is formed on the polyamide semipermeable membrane of Comparative Example 9, and the

TABLE 5

|  | Compound (A) | Compound (B) | Compound (C) | Compound (D) |
| --- | --- | --- | --- | --- |
| Example 7 | 50 mM dimethyl-acrylamide | 50 mM 4-vinylphenyl sodium sulfonate | 50 mM 1-vinyl-3-imidazolium chloride | 50 mM hydroxyethyl-acrylamide |
| Example 8 | 80 mM dimethyl-acrylamide | 30 mM 4-vinylphenyl sodium sulfonate | 30 mM 1-vinyl-3-imidazolium chloride | 60 mM hydroxyethyl-acrylamide |
| Example 9 | 40 mM N-methyl-acrylamide | 60 mM 4-vinylphenyl sodium sulfonate | 60 mM [2-(methacryloyloxy)ethyl]dimethyl-(3-sulfopropyl)ammonium hydroxide | 40 mM hydroxyethyl acrylate |
| Example 10 | 50 mM N-methyl-acrylamide | 25 mM sodium acrylate | 25 mM [2-(methacryloyloxy)ethyl]dimethyl-(3-sulfopropyl)ammonium hydroxide | 100 mM aminopropyl acrylate |
| Example 11 | 50 mM acrylamide | 50 mM sodium acrylate | 50 mM 1-allyl-3-imidazolium chloride | 50 mM aminopropyl acrylate |
| Example 12 | 50 mM dimethyl-acrylamide | 50 mM 4-vinylphenyl sodium sulfonate | 50 mM 1-vinyl-3-imidazolium chloride | 50 mM hydroxyethyl-acrylamide |

TABLE 6

|  | Initial Performance | | After Chlorine Resistance Test | | | After Fouling Resistance Test | |
| --- | --- | --- | --- | --- | --- | --- | --- |
|  | Salt Rejection Ratio (%) | Permeation Flux ($m^3/m^2/d$) | Salt Rejection Ratio (%) | Permeation Flux ($m^3/m^2/d$) | Ratio of Change in Salt Permeability | Permeation Flux ($m^3/m^2/d$) | Permeation Flux Retention Rate (%) |
| Comparative Example 9 | 99.1 | 0.703 | 80.21 | 1.09 | 42.1 | 0.35 | 50 |
| Comparative Example 10 | 50.45 | 0.3 | 50.05 | 0.314 | 1.06 | 0.216 | 72 |
| Comparative Example 11 | 19.96 | 0.398 | 19.13 | 0.439 | 1.16 | 0.34 | 85 |
| Example 7 | 99.1 | 0.273 | 98.96 | 0.264 | 1.12 | 0.215 | 79 |
| Example 8 | 99.15 | 0.25 | 99.01 | 0.262 | 1.22 | 0.2 | 80 |
| Example 9 | 99.25 | 0.275 | 99.1 | 0.285 | 1.24 | 0.21 | 76 |
| Example 10 | 99.12 | 0.259 | 99.01 | 0.28 | 1.21 | 0.2 | 77 |
| Example 11 | 99.11 | 0.24 | 99.01 | 0.245 | 1.13 | 0.197 | 82 |
| Example 12 | 99.11 | 0.271 | 98.03 | 0.272 | 2.24 | 0.214 | 79 |

[2. Evaluation of Membrane]

The salt rejection ratio, permeation flux, chlorine resistance test, and fouling resistance test were performed in the same manner as in first embodiment.

[3. Results]

In Table 6, the polymer layered semipermeable membranes of Examples 7 to 12 have a salt rejection ratio equal to or grater than that of the semipermeable membrane of Comparative Example 9 and at the same time, have a reduced ratio of change in salt permeability between before and after contact with chlorine, revealing that the semipermeable membrane exhibits oxidizing agent resistance even in the presence of heavy metal while maintaining its salt rejection performance.

In the membrane after chlorine resistance test of Comparative Example 9, the salt rejection ratio is 80.2% and therefore, the salt permeability is 100−80.2=19.8%, whereas in the membrane after chlorine resistance test of Comparative Example 10, the salt rejection ratio is 50.0% and therefore, the salt permeability is 100−50.0=50.0%. Accordingly, when the membrane after chlorine resistance test of Comparative Example 10 is overlaid on the membrane after chlorine resistance test of Comparative Example 9, the salt permeability is 0.198×0.500×100(%)=9.9(%), and in this case, the salt rejection ratio is expected to become 100−9.9=90.1%.

salt rejection ratio after chlorine resistance test of this polymer layered semipermeable membrane is 98.96%. In other words, the actual membrane exhibits a higher salt rejection ratio than that expected above. This is considered to occur because contact of heavy metal with polyamide is inhibited and in turn, oxidation of polyamide in the presence of heavy metal is inhibited.

Furthermore, in Table 6, the polymer layered semipermeable membranes of Examples 7 to 12 offer a high permeation flux retention rate after contact of polyoxyethylene (10) octyl phenyl ether, compared with the semipermeable membrane of Comparative Example 9, and are found to have excellent fouling resistance.

In addition, the IR spectrum, XPS and zeta potential under moisture conditioning of the obtained layered semipermeable membrane resulted in the values shown in Table 7.

TABLE 7

|  | Maximum Peak Intensity (—) | Peak Top Wavenumber ($cm^{-1}$) | N1s Peak Position (eV) | Surface Zeta Potential (mV) |
| --- | --- | --- | --- | --- |
| Comparative Example 9 | 0.3 | 3380 | 399 | −30 |
| Comparative Example 1 | 0.14 | 3430 | 402 | −1.5 |

TABLE 7-continued

| | Maximum Peak Intensity (-) | Peak Top Wavenumber (cm$^{-1}$) | N1s Peak Position (eV) | Surface Zeta Potential (mV) |
|---|---|---|---|---|
| Comparative Example 1 | 0.08 | 3485 | 402 | −3.6 |
| Example 7 | 0.09 | 3430 | 402 | −1.5 |
| Example 8 | 0.08 | 3410 | 402 | −3.6 |
| Example 9 | 0.1 | 3425 | 401 | −5 |
| Example 1 | 0.11 | 3400 | 402 | −8 |
| Example 1 | 0.12 | 3415 | 403 | 2 |
| Example 1 | 0.1 | 3400 | 402 | 5 |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2016-036910) filed on Feb. 29, 2016, the contents of which are incorporated herein by way of reference.

DESCRIPTION OF REFERENCE NUMERALS AND SIGNS 11, 12: Polymer layered semipermeable membrane
21, 23: Semipermeable layer
22: Coat layer
31: Support membrane
41: Separation Functional layer
51: Support layer
61: Substrate

The invention claimed is:

1. A layered semipermeable membrane comprising a semipermeable layer and a coat layer formed on the semipermeable layer, wherein said layered semipermeable membrane satisfies the following conditions (A), (B) and (C):
   (A) in a differential spectrum between an IR spectrum measured under conditions of 25° C. and a relative humidity of 97% and an IR, spectrum measured under conditions of 25° C. and a relative humidity of 3%, the maximum peak intensity between 3,700 cm$^{-1}$ and 2,900 cm$^{-1}$ is 0.08 or more,
   (B) a peak top wavenumber between 3,700 cm$^{-1}$ and 2,900 cm$^{-1}$ in the differential spectrum is 3,400 cm$^{-1}$ or more and 3,550 cm$^{-1}$ or less, and
   (C) in a X-ray photoelectron spectroscopic measurement performed by irradiating the coat layer with X-ray, a peak of N1s has a maximum value at 401 eV or more;
wherein the coat layer contains a copolymer Y having at least four kinds of repeating unit structures P1, P2, P3 and P4 different from each other, of which the repeating unit structure P1 has the following structure X1 in a side chain thereof, the repeating unit structure P2 has the following structure X2 in a side chain thereof, the repeating unit structure P3 has the following structure X3 in a side chain thereof, and the repeating unit structure P4 has the following structure X4 in a side chain thereof:

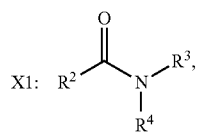

wherein each of R$^2$, R$^3$, R$^4$ is independently a group selected from an alkyl group, an alkylene group, an aryl group, and an arylene group, each of which may have a substituent, and any two of R$^2$, R$^3$ and R$^4$ may form a ring;
X2: a negatively charged group;
X3: a positively charged group; and
X4: an amino group, a hydroxyl group, or a thiol group;
wherein the repeating unit structure P2 does not have a positively charged group in the side chain simultaneously and the repeating unit structure P3 does not have a negatively charged group in the side chain simultaneously; and
wherein the copolymers Y are crosslinked to each other via the structure X4 contained in the side chain of said repeating unit structure P4.

2. The layered semipermeable membrane according to claim 1, wherein a surface zeta potential at pH 7 on the coat layer side is from −15 mV to +10 mV.

3. The layered semipermeable membrane according to claim 1, wherein the coat layer has both of the following structures (I) and (II):

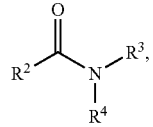

wherein X is a positively charged group and is an imidazolium group or a pyridinium group, each of which may have a substituent, R$^I$ is a group selected from an alkylene group having a carbon number of 6 or less, an arylene group, an amido group, and an ether group, each of which may have a substituent, Y is a negatively charged group and is a group selected from structures shown in (III) below, each of R$^2$, R$^3$ and R$^4$ is independently a group selected from an alkyl group, an alkylene group, an aryl group, and an arylene group, each of which may have a substituent, and any two of R$^2$, R$^3$ and R$^4$ may form a ring;

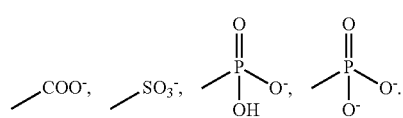

4. The layered semipermeable membrane according to claim 3, wherein in the structure (I), X is an imidazolium group which may have a substituent, R$^1$ is an ethylene group or a propylene group, each of which may have a substituent, and Y is a group selected from structures in (IV) below:

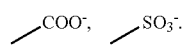

5. The layered semipermeable membrane according to claim 1, wherein the negatively charged group is at least one functional group selected from structures in (III) below:

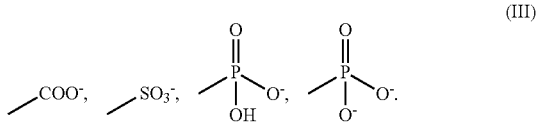

6. The layered semipermeable membrane according to claim 1, wherein the positively charged group is at least one functional group selected from an ammonium group, an imidazolium group, and a pyridinium group.

7. The layered semipermeable membrane according to claim 1, wherein the crosslinked structure comprises a structure represented by X4-Q-X4 and Q comprises either one of the following structures:

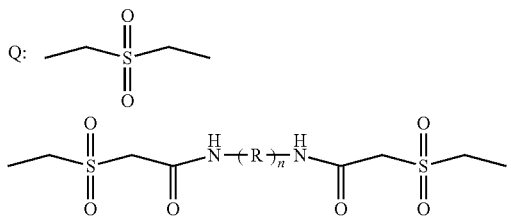

wherein R is a hydrocarbon group and n is an integer of 0 or more and 5 or less.

8. The, layered semipermeable membrane according to claim 1, wherein a thickness of the coat layer is from 50 nm to 500 nm.

9. The layered semipermeable membrane according to claim 1, wherein:
the semipermeable layer comprises a microporous support layer and a separation functional layer provided on the microporous support layer, and
the separation functional layer contains a polyamide formed by polycondensation of a polyfunctional amine with a polyfunctional acid halide.

10. The layered semipermeable membrane according to claim 1, comprising the semipermeable layer and the coat layer formed on the semipermeable layer, wherein:
the coat layer contains a polymerized product formed by polymerization of three or more kinds of monomers including at least the following compounds (A) (B) and (C) or a crosslinked body of the polymerized product:
(A) a compound having an ethylenically unsaturated group and the structure X1,
(B) a compound having an ethylenically unsaturated group and the structure X2 other than the compound (A), and
(C) a compound having an ethylenically unsaturated group and the structure X3, other than the compounds (A) and (B),
provided that compound (B) does not have a positively charged group simultaneously and compound (C) does not have a negatively charged group simultaneously.

11. The layered semipermeable membrane according to claim 10, wherein the coat layer comprises a polymerized product formed by polymerization of four or more kinds of monomers including at least the following compounds (A), (B), (C) and (D) or a crosslinked body of the polymerized product and the crosslink is formed via the structure X4 contained in a side chain of the polymerized product:
(A) a compound having an ethylenically unsaturated group and the structure X1,
(B) a compound having an ethylenically unsaturated group and the structure X2, other than the compound (A),
(C) a compound having an ethylenically unsaturated group and the structure X3, other than the compounds (A) and (B), and
(D) a compound having an ethylenically unsaturated group and the structure X4, other than the compounds (A), (B) and (C).

12. A method for producing the layered semipermeable membrane according to claim 1, comprising:
(1) a step of coating a separation functional layer with a solution containing at least a polymer obtained by polymerization of monomers represented by the following structures (V) and (VI) and a crosslinking agent, and
(2) a step of crosslinking the polymers to each other or the polymer to a semipermeable layer after the step (1) to form a coat layer:

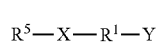

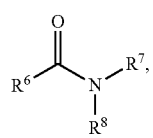

wherein X is a positively charged group and is an imidazolium group or a pyridinium group, each of which may have a substituent, $R^1$ is a group selected from an alkylene group having a carbon number of 6 or less, an arylene group, an amido group, and an ether group, each of which may have a substituent, Y is a negatively charged group and is a group selected from structures shown in (III) below, $R^5$ is a group having an ethylenically unsaturated group, at least one of $R^6$, $R^7$ and $R^8$ is a group having an ethylenically unsaturated group, the remainders are hydrogen or a group selected from an alkyl group, an alkylene group, an aryl group, and an arylene group, each of which may have a substituent, and may be the same or different, and in the case where two of $R^6$, $R^7$ and $R^8$ have no ethylenically unsaturated group, these two groups may form a ring;

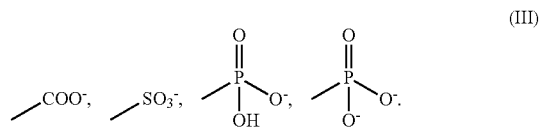

* * * * *